United States Patent
Recker et al.

(10) Patent No.: US 9,683,088 B2
(45) Date of Patent: Jun. 20, 2017

(54) PROCESS FOR REGENERATING SULFUR-CROSSLINKED RUBBER VULCANIZATES TO GIVE REGENERATES

(71) Applicant: Continental Reifen Deutschland GmbH, Hannover (DE)

(72) Inventors: Carla Recker, Hannover (DE); Lena Mueller, Lauenhagen (DE); Thomas Voelker, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 88 days.

(21) Appl. No.: 14/635,634

(22) Filed: Mar. 2, 2015

(65) Prior Publication Data

US 2015/0166759 A1   Jun. 18, 2015

Related U.S. Application Data

(63) Continuation of application No. PCT/EP2013/050006, filed on Jan. 2, 2013.

(30) Foreign Application Priority Data

Aug. 31, 2012 (DE) .......................... 10 2012 108 096

(51) Int. Cl.
| | | |
|---|---|---|
| *C08J 11/04* | (2006.01) | |
| *C08J 11/28* | (2006.01) | |
| *C08J 11/10* | (2006.01) | |
| *B29B 7/74* | (2006.01) | |
| *B29B 17/00* | (2006.01) | |
| *C08K 5/5398* | (2006.01) | |
| *C08K 5/548* | (2006.01) | |

(52) U.S. Cl.
CPC ............. *C08J 11/28* (2013.01); *B29B 7/7495* (2013.01); *C08J 11/10* (2013.01); *C08J 2317/00* (2013.01); *C08J 2321/00* (2013.01); *C08K 5/5398* (2013.01); *C08K 5/548* (2013.01); *Y02W 30/702* (2015.05); *Y02W 30/706* (2015.05)

(58) Field of Classification Search
CPC ................ C08K 5/18; C08L 7/00; C08L 9/00
USPC ......................... 521/41, 41.5; 524/156, 575.5
See application file for complete search history.

(56) References Cited

U.S. PATENT DOCUMENTS

| | | | |
|---|---|---|---|
| 6,465,672 B2 | 10/2002 | Michel et al. | |
| 2004/0034159 A1* | 2/2004 | Brandsch | ............... C08K 3/346 524/571 |
| 2011/0269855 A1* | 11/2011 | Marc | ........................ C08J 11/10 521/41 |
| 2012/0083559 A1* | 4/2012 | Costantini | ............. B60C 1/0016 524/122 |

FOREIGN PATENT DOCUMENTS

| | | |
|---|---|---|
| CA | 2134186 A1 | 12/1995 |
| DE | 10 2005 029 522 A1 | 1/2007 |
| RU | 2007106022 A | 8/2010 |
| WO | 2008/148706 A1 | 12/2008 |

OTHER PUBLICATIONS

International Search Report dated May 3, 2013 of international application PCT/EP2013/050006 on which this application is based.
Römpp Online Version 3.26, machine translation "Regenerate", edited by Römpp author, http://www.roempp.com/prod/roempp.php, downloaded Aug. 9, 2012, two pages.
Gibala, D., Hamed, G.R.: "Cure and mechanical behavior of rubber compounds containing ground vulcanizates—Part I—Cure behavior", Rubber Chemistry and Technology, 1997; 67(1): pp. 636 to 648.

* cited by examiner

*Primary Examiner* — Terressa Boykin
(74) *Attorney, Agent, or Firm* — Walter Ottesen, P.A.

(57) ABSTRACT

A process for regenerating sulfur-crosslinked rubber vulcanizates to regenerates, wherein at least one regenerating agent is used in the regeneration. The regenerating agent is selected from the group consisting of dithiophosphoryl polysulfides and/or silanes having a polysulfane group. Regenerates which have been produced by means of the process lead to improved or equal rolling resistance indicators and a lower compression set in vulcanized rubber mixtures compared to regenerates known in the prior art.

14 Claims, No Drawings

PROCESS FOR REGENERATING SULFUR-CROSSLINKED RUBBER VULCANIZATES TO GIVE REGENERATES

CROSS REFERENCE TO RELATED APPLICATIONS

This application is a continuation application of international patent application PCT/EP2013/050006, filed Jan. 2, 2013, designating the United States and claiming priority from German application 10 2012 108 096.8, filed Aug. 31, 2012, and the entire content of both applications is incorporated herein by reference.

FIELD OF THE INVENTION

The disclosure relates to a process for regenerating sulfur-crosslinked rubber vulcanizates to give regenerates. The disclosure further relates to the use of the regenerate produced by the process for the production of pneumatic vehicle tires.

BACKGROUND OF THE INVENTION

The disposal and utilization of rubber waste from various fields of industry is a continually growing problem both in terms of environmental pollution and reuse since the amount of rubber waste is continually increasing worldwide.

At present, for example, many millions of metric tons of used tires arise worldwide each year, about 25% of which are commercial vehicle tires. In Europe alone, 3.2 million metric tons of used tires arise every year at present, with the proportion of commercial vehicle used tires being about 0.8 million. A large part of the used tires is passed to utilization in terms of energy in the cement industry and is therefore no longer available for further use as material, despite an increasing shortage of raw materials.

Up to now, there are only very limited possibilities for utilization as material of rubber waste, in particular used tire material, in the form of granulated material or powder in mixtures for new products such as new tires. The most important use as material is the use of the granulated rubber or rubber powder, also referred to as ground rubber, of various particle sizes produced from rubber waste in rubber mats or other rubber products which are not subjected to dynamic loads.

The granulated rubbers or rubber powders from used tires can be added in small amounts as aggregate to freshly produced tire mixtures in tire production. However, the amount which can be used is very greatly restricted since the granulated particles act as small foreign bodies in the fresh tire mixture. The reason for this behavior is, inter alia, that strength and elongation of the used tire granules differ significantly from those of the fresh mixture after vulcanization in the tire mixture. The granulated tire particles are then vulcanized for a second time in the vulcanization of the new product. The first vulcanization of the granulated tire material was carried out previously in the used tire, the starting material for the granulated tire material. The used tire particles which have now been vulcanized for a second time display a difference in the strength/elongation behavior at the interface to the fresh tire mixture, which can have an adverse effect on the dynamic performance. In many rubber products which are not subjected to dynamic loads, for example, rubber mats, stands for mobile traffic signs on building sites or oblique curbstone driveways, granulated tire material or granulated material from other rubber products can be added to the fresh mixtures since in this case there is no dynamic stress as, for example, in the case of a tire.

To nevertheless be able to utilize rubber waste such as granulated used tire material to gain high value in rubber products, these can be regenerated in a known manner. In a regeneration process, the vulcanized granulated tire material is plasticized, that is, it is converted from the elastic state into a plastic state, by breaking the sulfur bridges formed by vulcanization. The regenerate formed can thus be added again as raw material to a fresh rubber mixture and be bound into this by vulcanization.

Apart from the breaking of the sulfur bridges, rubber chains, that is, carbon-carbon bonds, are also broken to a not inconsiderable extent in the regeneration processes known from the prior art. Such degradation behavior is usually undesirable. The shortened (degraded) polymer chains of the regenerate cause disadvantages in terms of the physical properties, for example, rebound resiliencies, in the vulcanizates produced therefrom, which is, for example, reflected in an increased rolling resistance of pneumatic vehicle tires.

There are numerous known processes for regenerating or devulcanizing vulcanized granulated or ground rubber. All processes have the objective of regenerating, that is, breaking up, the crosslinking structure. Sulfur bridges are broken by the action of thermal and mechanical energy on roll mills or in mixers and also with the aid of various sulfur-bridge-breaking chemicals. This procedure is generally referred to as regeneration. As indicated above, it is often necessary to accept the disadvantage that the molecules of the vulcanized granulated or ground rubber are additionally depolymerized. The now plastic product having a defined viscosity formed in the abovementioned processes is commercially available as regenerate for a variety of additions to tire and industrial rubber mixtures and displays the negative properties of unregenerated granulated or ground rubber in dynamically loaded products to a significantly reduced extent.

Processes for regenerating sulfur-crosslinked rubber vulcanizates with the aid of various substances and in various apparatuses have been known for a long time, with steam regeneration, mechanical regeneration, thermal regeneration, regeneration by means of sound waves, regeneration by means of radiation and chemical regeneration being known.

Typical regenerating agents are sulfides with or without amine substituents, for example, tolyl disulfides and dixylyl disulfides, mercaptan derivatives such as 2-mercaptobenzothiazole and also hydroxide ions. Such agents accelerate the oxidative cleavage of sulfur bridges of vulcanized elastomers in the regeneration. Furthermore, regenerating oils having a swelling effect, for example, tall oil or resin oil, which swell the vulcanizate to be regenerated and thus increase its surface area so that oxidative regeneration is accelerated, are known.

These agents, which have different modes of action, are often used in combination, as described, for example, in Römpp Online Version 3.26: "Prolonged heating of rubber vulcanizates (used tires) to 150-250° C. in the presence of regenerating agents such as ditolyl or dixylyl disulfide for chain cleavage and tall oil or resin oil for swelling gives regenerates which can be vulcanized again".

The comparatively high temperatures which are necessary to carry out the regeneration by means of such agents are disadvantageous. High temperatures usually increase the process costs and have a disadvantageous effect on the length of the polymer chains.

WO 2008/148706 A1 discloses processes for regenerating sulfur-crosslinked rubber vulcanizates, in which at least one dialkyl polysulfide is used as regenerating agent. As dialkyl polysulfides, it is possible to use, for example, branched dioctyl pentasulfide or dioctyl tetrasulfide. The regenerates produced therewith also display disadvantages in respect of the physical properties, in particular the buildup of heat in vulcanizates.

SUMMARY OF THE INVENTION

It is therefore an object of the present invention to provide a process for regenerating sulfur-crosslinked rubber vulcanizates to give regenerates, which makes it possible to achieve an improvement, compared to the prior art, in the degradation behavior under milder process conditions, that is, lower temperatures for a shorter time. The regenerates produced by the process should make it possible to achieve better or at least the same rolling resistance indicators and improved compressive deformation behavior compared to the regenerates known from the prior art in rubber mixtures. At the same time, the agents used should have no or very few or few critical hazard features according to the hazardous materials regulations.

The object is achieved according to the invention by use of at least one regenerating agent in the regeneration, where the regenerating agent is selected from the group consisting of dithiophosphoryl polysulfides and/or silanes having a polysulfane group.

It has surprisingly been found that the use of such a regenerating agent gives a selective process which leads, at comparatively low temperatures and a short process time, to improved degradation behavior, which is reflected in, inter alia, an improvement in the rolling resistance indicators of vulcanized rubber mixtures containing the regenerates produced by this process. At the same time, the vulcanizates comprising the regenerates which have been produced by the process display improved compressive deformation behavior compared to vulcanizates containing a regenerate which has been produced by means of regenerating agents known from the prior art.

In a preferred embodiment, the dithiophosphoryl polysulfide has the general formula I

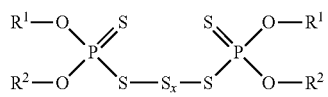
(I)

where $R^1$ and $R^2$ are identical or different and are selected from among linear or branched $C_3$-$C_{20}$-alkyl radicals and x=1 to 6.

The dithiophosphoryl polysulfide is particularly preferably a bis(O, O-2-ethylhexyl)thiophosphoryl polysulfide.

In a preferred embodiment, at least one silane having a polysulfane group of the general formula II or a mixture containing at least one silane having a polysulfane group of the general formula II $(R^2O)_{3-y}R^3_y$—Si—$R^1$—$S_x$—$R^1$—Si—$(OR^2)_{3-z}R^3_z$ (II)

where x=1 to 8 and the radicals $R^1$ in a molecule are identical or different and are selected from among linear or branched $C_1$-$C_{18}$-alkyl radicals, the radicals $R^2$ and $R^3$ in a molecule are identical or different and are selected from among linear or branched or cyclic saturated $C_1$-$C_{30}$-alkyl radicals and y and z are identical or different and are each from 0 to 3, is used as regenerating agent.

The number of hydrogen atoms in the alkyl radical is determined by the number of carbon atoms.

Preference is given to x being from 1 to 5, particularly preferably from 2 to 4 and in a very particularly preferred embodiment x=4.

In a particularly preferred further development, the silane having a polysulfane group is a bis(trialkoxysilyl)propyl polysulfane. Here, z=0, $R^1$ is a propyl radical and $R^2$ is an alkyl radical having from 1 to 30 carbon atoms. This silane has the general constitutional formula III $(R^2O)_3$—Si—$(CH_2)_3$—$S_x$—$(CH_2)_3$—Si—$(OR^2)_3$. (III)

The radical $R^2$ is very particularly preferably an ethyl group, so that the silane having a polysulfane group is a bis(triethoxysilyl)propyl polysulfane.

In a further preferred development of this embodiment, the radicals $R^2$ and/or $R^3$ of the silane having a polysulfane group additionally contain from 1 to 10 nitrogen atoms (N) and/or oxygen atoms (O) as heteroatoms in the carbon chain. In this further development, the radicals $R^2$ and/or $R^3$ may be, for example, a unit having the constitutional formula IV

—$(CH_2$—$CH_2$—$O)_5$—$(CH_2)_{12}CH_3$. (IV)

In this case, the radicals $R^2$ and/or $R^3$ contain five oxygen atoms as heteroatoms.

In a further embodiment, the silane having a polysulfane group has the general formula V $(R^2O)_{3-y}R_{3y}$—Si—$R^1$—$S_x$—$R^1$—Si—$(O_2R^2)R^3$ (V)

where x=1 to 8 and the radicals $R^1$ in a molecule are identical or different and are selected from among linear or branched $C_1$-$C_{18}$-alkyl radicals, the radicals $R^2$ in a molecule are identical or different and are selected from among linear or branched or cyclic saturated $C_1$-$C_{30}$-alkyl radicals and y and z are identical or different and are each from 0 to 3 and the radicals $R^3$ in a molecule are identical or different and are selected from among linear or branched $C_1$-$C_{10}$-alkyl or alkoxy radicals.

In this embodiment, a radical $R^2$ can bridge two oxygen atoms.

In a further embodiment, the silane having a polysulfane group has the general formula VI $(R^2O_2)R^3$—Si—$R^1$—$S_x$—$R^1$—Si—$(O_2R^2)R^3$ (VI)

where x=1 to 8 and the radicals $R^1$ in a molecule are identical or different and are selected from among linear or branched $C_1$-$C_{18}$-alkyl radicals, the radicals $R^2$ in a molecule are identical or different and are selected from among linear or branched or cyclic saturated $C_1$-$C_{30}$-alkyl radicals and the radicals $R^3$ in a molecule are identical or different and are selected from among linear or branched $C_1$-$C_{10}$-alkyl or alkoxy radicals.

In this embodiment, a radical $R^2$ can bridge two oxygen atoms at both ends of the molecule.

A further process for regenerating sulfur-crosslinked rubber vulcanizates to give regenerates is disclosed which makes it possible to achieve an improvement in the degradation behavior under milder process conditions compared to the prior art. The regenerates produced by the process make it possible to achieve improved or at least the same rolling resistance indicators and also improved compressive deformation behavior compared to the regenerates known from the prior art in rubber mixtures. At the same time, the agents used should have no or little contaminating effect.

This further object is achieved by a process comprising:
placing a sulfur-crosslinked rubber vulcanizate to be regenerated in amounts of from 68 to 98% by weight in a mechanical mixer;

heating the sulfur-crosslinked rubber vulcanizate to be regenerated to from 50 to 70° C.;

adding at least one dithiophosphoryl polysulfide and/or at least one silane having a polysulfane group in amounts of from 2 to 15% by weight to produce a mixture; and, mixing the mixture for a period of time of from 5 to 35 minutes at a temperature of from 80 to 150° C.

Here, what has been said above in respect of the constitutional formulae and the preferred embodiments and further developments applies to the dithiophosphoryl polysulfide and the silane having a polysulfane group.

Thus, a mixture which before regeneration contains from 68 to 98% by weight of the rubber vulcanizate to be regenerated and from 2 to 15% by weight of at least one dithiophosphoryl polysulfide and/or at least one silane having a polysulfane group, based on a total amount of 100% by weight, is produced in a mechanical mixer. The regenerate or regenerates is/are formed from this mixture when the process is carried out.

The mixture before regeneration preferably contains from 85 to 97% by weight, particularly preferably from 85 to 95% by weight and very particularly preferably from 89 to 93% by weight, of the rubber vulcanizate to be regenerated.

The amount of the at least one dithiophosphoryl polysulfide and/or at least one silane having a polysulfane group is preferably from 2 to 12% by weight, particularly preferably from 2 to 12% by weight, very particularly preferably from 4 to 10% by weight.

Moreover, the mixture can have such a composition that, at 100% by weight, the mixture contains further additives. This means that one or more additives can be added additionally before or after the addition of at least one dithiophosphoryl polysulfide and/or at least one silane having a polysulfane group.

Further additives include sulfur; plasticizers, such as oils; and fillers, such as carbon black or silica.

In a preferred embodiment, the mixture contains from 0.1 to 10% by weight of sulfur, particularly preferably from 1 to 8% by weight of sulfur.

In a further preferred embodiment, the mixture additionally contains from 0.1 to 15% by weight, particularly preferably from 1 to 3% by weight, of at least one oil.

In a further preferred embodiment of the invention, the mixture contains from 0.1 to 10% by weight of at least one filler. The filler can be a filler customary in the tire industry, for example, carbon black and/or silica.

The mixture particularly preferably contains from 0.1 to 8% by weight, very particularly preferably from 1 to 3% by weight, of at least one carbon black and/or at least one silica.

The silica preferably has a CTAB surface area in accordance with ASTM D 3765 of from 110 to 350 m$^2$/g.

It is within the scope of the disclosure for only one of the abovementioned additives or two or more of the abovementioned additives to be introduced in at least one further process step before regeneration.

The regeneration process is carried out in a mechanical mixer having intermeshing or touching rotors. The fill volume of the mechanical mixer is from 50 to 95%, preferably from 60 to 90%, particularly preferably from 62 to 85%.

It is advantageous for the sulfur-crosslinked rubber vulcanizate to be regenerated to be comminuted in a further process step to form a granulated material before regeneration.

The particle size of the granulated material in accordance with DIN 53734 after comminution is from 0.001 to 70 mm, preferably from 0.001 to 20 mm, particularly preferably from 0.001 to 0.5 mm, very particularly preferably from 0.001 to 0.4 mm. The shape of the particles of the granulated material after comminution can be spherical, flat or elongated.

Comminution of the sulfur-crosslinked rubber vulcanizate is carried out in milling processes known from the prior art, in particular an ambient or cryogenic milling process.

As an alternative to the mechanical mixer, the regeneration process can be carried out on one or more roll mills, on a planetary gear extruder, on a twin-screw extruder or a single-screw extruder. The temperature here is from 40 to 150° C. at a time period of from 5 to 35 minutes.

Preference is given to sulfur-crosslinked rubber vulcanizates originating from used tires or conveyor belts or vulcanized waste obtained in the production of industrial rubber articles or pneumatic vehicle tires.

The sulfur-crosslinked rubber vulcanizate can be based on the following rubbers, either alone or in a blend: natural polyisoprene (NR) and/or synthetic polyisoprene (IR) and/or butadiene rubber (BR) and/or styrene-butadiene rubber (SBR) and/or butyl rubber and/or halobutyl rubber and/or nitrile-butadiene rubber (NBR) and/or hydrogenated acrylonitrile-butadiene rubber (HNBR) and/or ethylene-propylene-diene rubber (EPDM).

The sulfur-crosslinked rubber vulcanizate preferably contains natural polyisoprene (NR) and/or synthetic polyisoprene (IR) and/or butadiene rubber (NBR) and/or styrene-butadiene rubber (SBR) and/or butyl rubber and/or halobutyl rubber.

It is a further object to provide a regenerate which, compared to the prior art, makes it possible to achieve better or at least equal rolling resistance indicators and a lower compression set. This object is achieved by the abovementioned processes.

The regenerate of the invention is preferably used for producing a pneumatic vehicle tire, with the regenerate preferably being present as mixture constituent in at least one rubber mixture of at least one component of a pneumatic vehicle tire. The regenerate is also suitable for producing industrial rubber articles such as conveyor belts, belts, straps, hoses, printing blankets, air springs or damping elements; here too, at least one rubber mixture is present as mixture constituent in these articles.

DESCRIPTION OF THE PREFERRED EMBODIMENTS OF THE INVENTION

The disclosure will now be illustrated with the aid of comparative examples and working examples.

Regenerates were firstly produced, namely regenerates ER1 and ER2, according to the disclosed process using two different regenerating agents and the regenerates RG3 and RG4 by means of regenerating agents known from the prior art.

The production of the regenerate ER1 from vulcanized rubber vulcanizates was carried out using the process steps in the following order:

comminution of the sulfur-crosslinked rubber vulcanizate by means of a cryogenic milling process (pin mill) to give a granulated material having a particle size of from 0.001 to 0.5 mm placing of 90.7% by weight of the comminuted sulfur-crosslinked rubber vulcanizate to be regenerated in a mechanical mixer heating of the comminuted sulfur-crosslinked rubber vulcanizate to be regenerated to 60° C.

addition of 2% by weight of carbon black (N121)

addition of 5.5% by weight of regenerating agent (bis(triethoxysilyl)propyl tetrasulfane (TESPT), addition of 2% by weight of TDAE oil (TDAE=treated aromatic extract)

mixing of the abovementioned constituents to give a mixture for a period of 20 minutes at a temperature of 100° C.

cooling of the mixture.

Production of the regenerates ER2 and also RG3 and RG4 was carried out analogously, in these cases with addition of the following regenerating agents:

ER2: 5.5% by weight of bis(O,O-2-ethylhexylthiophosphoryl) polysulfide, Rhenocure SDT 50®, from Rheinchemie GmbH RG3: 5.5% by weight of CBS (=N-cyclohexyl-2-benzothiazole-sulfenamide), RG4: 5.5% by weight of dioctyl pentasulfide, Aktiplast GE1979, from Rheinchemie GmbH The regenerates produced using the various regenerating agents were in each case added in amounts of 60 phr to a rubber mixture (base mixture) B1, in each case added in amounts of 82 phr to a rubber mixture (base mixture) B2 and in each case added in amounts of 43 phr to a rubber mixture (base mixture) B3, the compositions of which are shown in Table 1.

TABLE 1

| Constituents of base mixture | Unit | B1 | B2 | B3 |
|---|---|---|---|---|
| NR | phr | 100 | 30 | 40 |
| IR | phr | — | — | 10 |
| BR | phr | — | 3 | 20 |
| SBR | phr | — | — | 30 |
| SSBR | phr | — | 67 | — |
| Carbon black N121 | phr | 47 | — | — |
| Carbon black N339 | phr | — | 18 | 30 |
| Silica, BET: 200 m²/g | phr | — | 85 | — |
| Silane, TESPD | phr | — | 7.4 | — |
| Plasticizer TDAE | phr | 2 | 37 | 8 |
| Aging inhibitor | phr | 6 | 7.8 | 8 |
| Zinc oxide | phr | 3 | 4.5 | 2.5 |
| Stearic acid | phr | 2 | 1 | 2.25 |
| Accelerator DPG* | phr | — | 2.2 | — |
| Accelerator CBS* | phr | — | 2.5 | 1 |
| Accelerator TBBS* | phr | 0.75 | — | — |
| Sulfur* | phr | 1.65 | 1.7 | 2.2 |

*Adaptation in accordance with Gibala D, Hamed GR.: Cure and mechanical behavior of rubber compounds containing ground vulcanizates - Parte I - Cure behavior, *Rubber Chemistry and Technology*, 1997; 67(1): 636-648 may be appropriate and advantageous.

Production of the mixture was carried out under conventional conditions in a plurality of stages in a tangential laboratory mixer. Test specimens were produced from all mixtures by 20 minute vulcanization under pressure at 160° C. and materials properties typical of the rubber industry were determined on these test specimens using the test methods indicated below.

Shore A hardness at room temperature (RT) and 70° C. in accordance with DIN 53 505

Rebound resiliencies at room temperature (RT) and 70° C. in accordance with DIN 53 512

Tensile strength at room temperature in accordance with DIN 53 504

Elongation at break at room temperature in accordance with DIN 53 504

Stress at 300% elongation at room temperature (modulus 300) in accordance with DIN 53 504

Compression set using a method based on DIN ISO 815-1

Abrasion at room temperature in accordance with DIN/ISO 4649

Relative degree of crosslinking of 5% or 10% (t5, t10 partial vulcanization time) by means of rotor-less vulcameter (MDR=Moving Disc Rheometer) in accordance with DIN 53 529

Furthermore, vulcanizates of the rubber mixtures were stored in air for 14 days at 70° C. and their physical properties were likewise determined.

The results of the measurements and also the assignment of the regenerates used to the variants are summarized in Tables 2 and 3. Here, the rubber mixture E1 contains 60 phr of the regenerate ER1, E2 contains 60 phr of the regenerate ER2, E3 contains 82 phr of TESPD and E4 contains 43 phr of TESPD.

The rubber mixtures V1 and V2 contain 60 phr of the regenerate RG3 and 60 phr of the regenerate RG4, respectively. The rubber mixture V4 contains 82 phr of the regenerate RG4 and the rubber mixture V5 contains 43 phr of the regenerate RG4.

As further comparative example, the rubber mixture V3 contains 60 phr of the regenerate RG5 which is a regenerate which is commercially available under the trade name ECORR RNR 30 from RubberResources.

The rubber mixtures Ref1, Ref2 and Ref3 which do not contain any regenerate and therefore have the compositions indicated in Table 1 serve as reference.

TABLE 2

| Regenerate | Unit | Ref1 — | V1 RG3 | V2 RG4 | V3 RG5 | E1 ER1 | E2 ER2 |
|---|---|---|---|---|---|---|---|
| Physical properties before aging | | | | | | | |
| Shore hardness at RT | Shore A | 62 | 63 | 60 | 60 | 62 | 57 |
| Shore hardness at 70° C. | Shore A | 57 | 58 | 55 | 54 | 58 | 52 |
| Rebound resilience at RT | % | 46 | 44.5 | 41 | 40.5 | 45 | 46 |
| Rebound resilience at 70° C. | % | 61 | 59 | 55 | 54 | 58 | 59 |
| Tensile strength | MPa | 23 | 20 | 20 | 18 | 20 | 17 |
| Modulus 300 | MPa | 13 | 13 | 11 | 11 | 12 | 11 |
| Elongation at break | % | 496 | 452 | 506 | 494 | 467 | 434 |
| Abrasion | mm³ | 104 | 117 | 122 | 130 | 117 | 117 |
| Compression set at 70° C. | % | 28 | 35 | 37 | 36 | 33 | 35 |
| t10 | min | 2.2 | 1.0 | 1.7 | 2.1 | 2.2 | 0.72 |
| t5 | min | 1.63 | 0.6 | 0.2 | 1.7 | 1.9 | 0.17 |
| Physical properties after aging for 14 days at 70° C., air | | | | | | | |
| Shore hardness at RT | Shore A | 67 | 69 | 67 | 67 | 68.5 | |
| Shore hardness at 70° C. | Shore A | 64 | 66 | 63 | 63 | 65 | |
| Rebound resilience at RT | % | 47 | 47 | 43 | 43 | 46 | |
| Rebound resilience at 70° C. | % | 63 | 61 | 58 | 59 | 60 | |
| Tensile strength | MPa | 24 | 18 | 18 | 16 | 18 | |
| Modulus 300 | MPa | 17 | 17 | 15 | 15 | 17 | |
| Elongation at break | % | 438 | 338 | 389 | 359 | 346 | |

TABLE 3

| Regenerate | Unit | Ref2 — | V4 RG4 | E3 TESPD | Ref3 — | E4 RG4 | V5 TESPD |
|---|---|---|---|---|---|---|---|
| Physical properties before aging | | | | | | | |
| Shore hardness at RT | Shore A | 73 | 77 | 74 | 48.8 | 51 | 47.3 |
| Shore hardness at 70° C. | Shore A | 67 | 70 | 66 | 45.9 | 46.7 | 42.7 |
| Rebound resilience at RT | % | 15.8 | 15.5 | 15 | 58.7 | 53.8 | 51.2 |
| Rebound resilience at 70° C. | % | 38 | 37.5 | 34 | 68 | 64 | 61.2 |
| Modulus 200 | MPa | 6.1 | 7.2 | 4.8 | — | — | — |
| Modulus 300 | MPa | — | — | — | 4.4 | 5.4 | 3.9 |
| Tensile strength | MPa | 12.7 | 10.9 | 11.5 | 13.8 | 9.2 | 8.7 |
| Elongation at break | % | 394 | 294 | 396 | 610 | 461 | 519 |
| Abrasion | mm$^3$ | — | — | — | 95 | 102 | 106 |
| t10 | min | 0.69 | 0.34 | 0.22 | 2.7 | 1.8 | 1.7 |
| t5 | min | 0.32 | 0.23 | 0.16 | 2.4 | 1.6 | 1.5 |
| Physical properties after aging for 14 days at 70° C., air | | | | | | | |
| Shore hardness at RT | Shore A | 77.2 | 81.1 | 78.4 | 55.7 | 58.4 | 55.3 |
| Shore hardness at 70° C. | Shore A | 73.6 | 77.4 | 74.8 | 53.8 | 55.8 | 52.1 |
| Rebound resilience at RT | % | 16.1 | 16.4 | 15.7 | 63.3 | 57.3 | 56 |
| Rebound resilience at 70° C. | % | 39.6 | 38.5 | 37.6 | 72 | 68.1 | 67.4 |
| Tensile strength | MPa | 10.9 | 9.9 | 11.3 | 11 | 8.4 | 8.4 |
| Modulus 200 | MPa | 8.3 | 9.9 | 7.2 | 4.4 | 5.2 | 4.1 |
| Modulus 300 | MPa | — | — | — | — | — | — |
| Elongation at break | % | 280 | 216 | 306 | 401 | 305 | 354 |

As can be seen from Tables 2 and 3, the vulcanizates of the rubber mixtures E1, E2, E3, and E4 which contain the regenerates according to the disclosure TSPD, ER1 and ER2 have higher rebound resiliencies than rubber mixtures containing regenerates known from the prior art. The rebound resilience at 70° C. represents a rolling resistance indicator, so that pneumatic vehicle tires containing the regenerates according to the invention in at least one rubber mixture are expected to give rise to a lower fuel consumption than tires containing regenerates known from the prior art. Furthermore, the rubber mixtures E1 and E2 display a comparatively low compression set compared to the mixtures V1, V2 and V3. At the same time, it can be seen that the process reliability generally increases in the case of the mixtures according to the disclosure.

It is understood that the foregoing description is that of the preferred embodiments of the invention and that various changes and modifications may be made thereto without departing from the spirit and scope of the invention as defined in the appended claims.

What is claimed is:

1. A process for regenerating sulfur-crosslinked rubber vulcanizates to give regenerates comprising:
   providing at least one regenerating agent for regenerating sulfur-crosslinked rubber vulcanizates,
   wherein the regenerating agent is selected from the group consisting of dithiophosphoryl polysulfides and silanes having a polysulfane group, and
   mixing a mixture of the at least one regenerating agent and sulfur-crosslinked rubber vulcanizates for a period of time of from 5 to 35 minutes.

2. The process as claimed in claim 1, wherein the dithiophosphoryl polysulfide has the general formula I

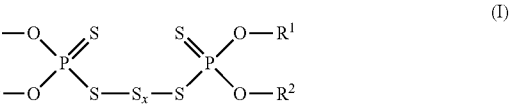

where $R^1$ and $R^2$ are identical or different and are selected from among linear or branched $C_3$-$C_{20}$-alkyl radicals and x=1 to 6.

3. The process as claimed in claim 2, wherein the dithiophosphoryl polysulfide is a bis(O,O-2-ethylhexyl)thiophosphoryl polysulfide.

4. The process as claimed in claim 1, wherein the silane having a polysulfane group has the general formula II

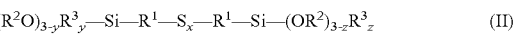

$$(R^2O)_{3-y}R^3{}_y\text{—Si—}R^1\text{—}S_x\text{—}R^1\text{—Si—}(OR^2)_{3-z}R^3{}_z \qquad (II)$$

where x=1 to 8 and the radicals $R^1$ in a molecule are identical or different and are selected from among linear or branched $C_1$-$C_{18}$-alkyl radicals, the radicals $R^2$ and $R^3$ in a molecule are identical or different and are selected from among linear or branched or cyclic saturated $C_1$-$C_{30}$-alkyl radicals and y and z are identical or different and are each from 0 to 3, wherein the radicals $R^2$ and/or $R^3$ optionally contain from 1 to 10 nitrogen atoms (N) and/or oxygen atoms (O) as heteroatoms in the carbon chain.

5. The process as claimed in claim 4, wherein the silane having a polysulfane group is a bis(trialkoxysilyl)propyl polysulfane.

6. The process as claimed in claim 4, wherein the radicals $R^2$ and/or $R^3$ additionally contain from 1 to 10 nitrogen atoms (N) and/or oxygen atoms (O) as heteroatoms in the carbon chain.

7. The process as claimed in claim 1, wherein the silane having a polysulfane group has the general formula V

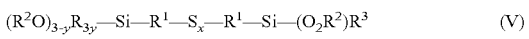

$$(R^2O)_{3-y}R_{3y}\text{—Si—}R^1\text{—}S_x\text{—}R^1\text{—Si—}(O_2R^2)R^3 \qquad (V)$$

where x=1 to 8 and the radicals $R^1$ in a molecule are identical or different and are selected from among linear or branched $C_1$-$C_{18}$-alkyl radicals, the radicals $R^2$ in a molecule are identical or different and are selected from among linear or branched or cyclic saturated $C_1$-$C_{30}$-alkyl radicals and y and z are identical or different and are each from 0 to 3 and the radicals $R^3$ in a molecule are identical or different and are selected from among linear or branched $C_1$-$C_{10}$-alkyl or alkoxy radicals.

8. The process as claimed in claim 1, wherein the silane having a polysulfane group has the general formula VI

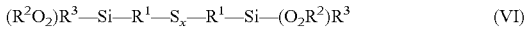

$$(R^2O_2)R^3\text{—Si—}R^1\text{—}S_x\text{—}R^1\text{—Si—}(O_2R^2)R^3 \qquad (VI)$$

where x=1 to 8 and the radicals $R^1$ in a molecule are identical or different and are selected from among linear or branched $C_1$-$C_{18}$-alkyl radicals, the radicals $R^2$ in a molecule are identical or different and are selected from among linear or branched or cyclic saturated $C_1$-$C_{30}$-alkyl radicals and the radicals $R^3$ in a molecule are identical or different and are selected from among linear or branched $C_1$-$C_{10}$-alkyl or alkoxy radicals.

9. A process for regenerating sulfur-crosslinked rubber vulcanizates to give regenerates, comprising:

placing the sulfur-crosslinked rubber vulcanizate to be regenerated in amounts of from 68 to 98% by weight in a mechanical mixer;

heating the sulfur-crosslinked rubber vulcanizate to be regenerated to a temperature of from 50 to 70° C.;

adding at least one dithiophosphoryl polysulfide and/or at least one silane having a polysulfane group in amounts of from 2 to 15% by weight to form a mixture; and, mixing the mixture for a period of time of from 5 to 35 minutes at a temperature of from 80 to 150° C.

10. The process as claimed in claim 1, wherein the sulfur-crosslinked rubber vulcanizates originate from used tires or conveyor belts or vulcanized waste obtained in the production of industrial rubber articles or pneumatic vehicle tires.

11. A regenerate produced as claimed in the process as claimed in claim 1.

12. The regenerate as claimed in claim 11 for producing pneumatic vehicle tires.

13. A process of regenerating sulfur-crosslinked rubber vulcanizates comprising adding dithiophosphoryl polysulfides as regenerating agents, and mixing the resulting mixture for a period of time of from 5 to 35 minutes.

14. A process for regenerating sulfur-crosslinked rubber vulcanizates comprising adding silanes having a polysulfane group as regenerating agents, and mixing the resulting mixture for a period of time of from 5 to 35 minutes.

* * * * *

UNITED STATES PATENT AND TRADEMARK OFFICE
CERTIFICATE OF CORRECTION

PATENT NO. : 9,683,088 B2  
APPLICATION NO. : 14/635634  
DATED : June 20, 2017  
INVENTOR(S) : C. Recker et al.

Page 1 of 1

It is certified that error appears in the above-identified patent and that said Letters Patent is hereby corrected as shown below:

In the Specification

In Column 4:
Line 28: delete "$(R^2O)_{3-y}R_{3y}\text{-Si-}R^1\text{-}S_x\text{-}R^1\text{-Si-}(O_2R^2)R^3$" and substitute
-- $(R^2O)_{3-y}R^3_y\text{-Si-}R^1\text{-}S_x\text{-}R^1\text{-Si-}(O_2R^2)R^3$ -- therefor.

In the Claims

In Column 10:
Line 47: delete "$(R^2O)_{3-y}R_{3y}\text{-Si-}R^1\text{-}S_x\text{-}R^1\text{-Si-}(O_2R^2)R^3$" and substitute
-- $(R^2O)_{3-y}R^3_y\text{-Si-}R^1\text{-}S_x\text{-}R^1\text{-Si-}(O_2R^2)R^3$ -- therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*